US012724512B2

(12) United States Patent
Lin et al.

(10) Patent No.: US 12,724,512 B2
(45) Date of Patent: Sep. 1, 2026

(54) TOUCH DEVICE AND METHOD THEREOF FOR ENHANCING ENERGY EFFICIENCY

(71) Applicant: NOVATEK Microelectronics Corp., Hsin-Chu (TW)

(72) Inventors: Chun-Hung Lin, Miaoli County (TW); Yuan-Fu Hsueh, Hsinchu City (TW); Yun-Hsiang Yeh, Hsinchu City (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 18/981,632

(22) Filed: Dec. 15, 2024

(65) Prior Publication Data

US 2026/0169586 A1 Jun. 18, 2026

(51) Int. Cl.
*G06F 3/041* (2006.01)
*G06F 1/3234* (2019.01)
*G06F 3/044* (2006.01)

(52) U.S. Cl.
CPC ...... *G06F 3/041661* (2019.05); *G06F 1/3262* (2013.01); *G06F 3/044* (2013.01)

(58) Field of Classification Search
CPC ... G06F 3/041661; G06F 1/3262; G06F 3/044
See application file for complete search history.

(56) References Cited

U.S. PATENT DOCUMENTS

2011/0057903 A1* 3/2011 Yamano ................ G06F 3/0237 345/174
2011/0285644 A1* 11/2011 Chang .............. G06F 3/041661 345/173
2012/0075205 A1* 3/2012 Huang ................ G06F 3/04166 345/173
2013/0027323 A1* 1/2013 Chang .................. G06F 1/3203 345/173
2013/0100071 A1* 4/2013 Wright ................ G06F 3/04166 345/173
2014/0218329 A1* 8/2014 Schmidt ........... G06F 3/041661 345/174
2015/0022485 A1* 1/2015 Chen ...................... G06F 3/046 345/174
2016/0216828 A1* 7/2016 Lee .................. G06F 3/041661
2019/0129564 A1 5/2019 Kim
2019/0265826 A1* 8/2019 Matsuishi ............ G06F 3/0412
2020/0393948 A1* 12/2020 Thomas ................ G06F 1/3262
2021/0034216 A1* 2/2021 Huang .................. G06F 3/0418
2021/0056333 A1* 2/2021 Cheng ................ G06V 40/1318
2024/0241599 A1* 7/2024 Kashiwazaki .... G06F 3/041661

FOREIGN PATENT DOCUMENTS

CN 102043520 A 5/2011
TW 201835736 A 10/2018
TW 202022573 A 6/2020

* cited by examiner

*Primary Examiner* — Hong Zhou
(74) *Attorney, Agent, or Firm* — Winston Hsu

(57) ABSTRACT

A method for use by a touch device to operate a touch panel includes allocating a first area of the touch panel to a touch control circuit, and performing a 2-dimensional scan on the first area. The method further includes allocating a second area of the touch panel to the touch control circuit, and applying a scan method or scan rate to the second area different from the first area.

18 Claims, 16 Drawing Sheets

TOUCH DEVICE AND METHOD THEREOF FOR ENHANCING ENERGY EFFICIENCY

BACKGROUND OF THE INVENTION

1. Field of the Invention

The invention relates to touch technology, and in particular, to a touch device and method thereof for enhancing energy efficiency.

2. Description of the Prior Art

Touch technology has revolutionized human-computer interaction by enabling direct manipulation of graphical interfaces via physical contact. Conventional control method of touch panels typically employ a column-based scanning mechanism, where touch detection is performed by sequentially scanning groups of columns at predetermined time intervals across the entire panel.

However, this traditional full-panel scanning approach presents several operational inefficiencies. When the system does not require touch detection across the entire screen, scanning non-essential areas unnecessarily consumes power. This power consumption becomes particularly problematic in battery-operated mobile devices where energy efficiency is crucial. Furthermore, in scenarios where applications demand higher refresh rates for specific regions of the touch panel, the time spent scanning non-critical areas creates unnecessary latency, potentially degrading the user experience in touch-sensitive applications that require rapid response times.

SUMMARY OF THE INVENTION

According to an embodiment of the invention, a method for use by a touch device to operate a touch panel includes allocating a first area of the touch panel to a touch control circuit, and performing a 2-dimensional scan on the first area.

According to another embodiment of the invention, a touch device includes a touch panel and a touch control device. The touch control device is coupled to the touch panel, to be allocated a first area of the touch panel and to perform a 2-dimensional (2D) scan on the first area.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
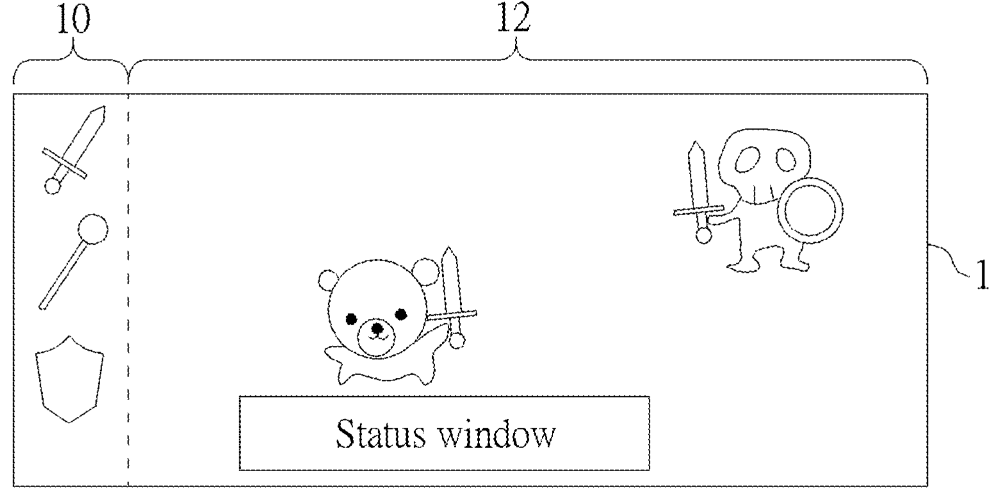
FIG. 1A and FIG. 1B are schematic diagrams of a touch panel adopting a multi-area scanning scheme according to two embodiments of the invention.
Figure 1B:
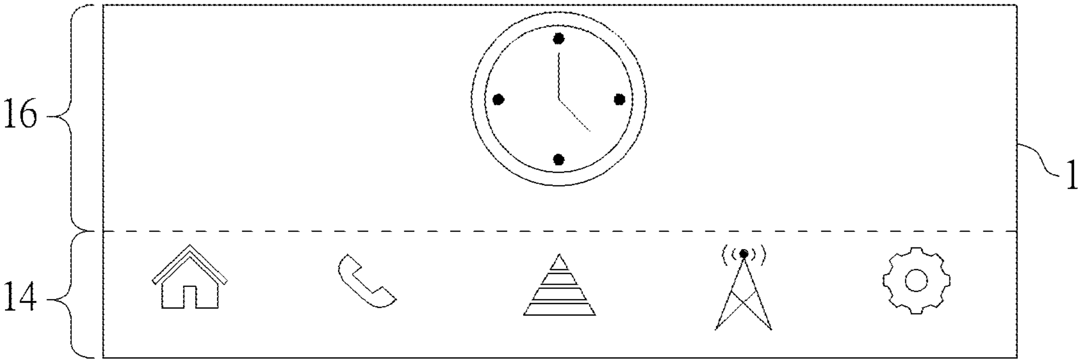

FIGS. 1A and 1B are schematic diagrams of a touch panel 1 adopting a multi-area scanning scheme according to two embodiments of the invention, where distinct areas of the touch panel 1 are scanned at varying sensitivity levels, enhancing the overall energy efficiency of the touch device while preserving a seamless user experience. The touch panel 1 may be a capacitive touch panel, detecting touch inputs from a conductive object such as the human body or a capacitive stylus, allowing for precise and responsive interaction with a touch device adopting the touch panel 1. In some embodiments, the touch panel 1 may be a touch-screen, displaying visual content as well as capturing touch inputs. In practical applications, it is often unnecessary for the entire surface of the touch panel 1 to be active and responsive to touch inputs at all times. Instead, only specific scan areas of the touch panel 1 are expected to receive touch inputs based on the application's property and user interaction patterns.

For instance, in a video game application as illustrated in FIG. 1A, the touch panel 1 is divided into a function area 10 at the left and a video display area 12 at the right. The function area 10 may house various gaming control and action buttons for attacking, defending, or accessing game menus, and may be the primary region where touch inputs are expected, as players frequently interact with the gaming controls during gameplay. On the other hand, the video display area 12 may display visual content such as the game environment, characters, and animations, and may not be intended to receive frequent touch inputs, as the main function is to provide visual feedback to the player. By focusing the touch sensitivity on the function area 10 and reducing or disabling the touch sensitivity on the video display area 12, the smartphone adopting the touch panel 1 may conserve power and improve performance without compromising the gaming experience. The selective touch activation ensures that the function area 10 remains responsive where needed most, while reducing or minimizing unnecessary power consumption in the video display area 12 that does not require touch interaction.

Similarly, in an on-vehicle display application as illustrated in FIG. 1B, the touch panel 1 is divided into a function area 14 at the bottom and an on-vehicle display area 16 at the top to enhance functionality and efficiency. The function area 14 houses various function icons for vehicle controls such as home, making car calls, displaying digital speedometers, establishing internet connections, and accessing the setting menu. This function area 14 is the primary region where touch inputs are anticipated, as drivers and passengers frequently interact with the vehicle controls to manage different aspects of a vehicle system adopting the touch panel 1. The on-vehicle display area 16 may present visual content, displaying information such as navigation maps, multimedia content, or other relevant vehicle data. Unlike the function area 14, the on-vehicle display area 16 is not intended to receive frequent touch inputs, as the main role thereof is to provide visual feedback rather than interactive control. By implementing selective touch activation, the vehicle system ensures that the function area 14 remains responsive to touch inputs where needed most, while reducing or minimizing unnecessary power consumption in the on-vehicle display area 16, which does not require touch interaction. The approach not only enhances the overall user experience by maintaining responsiveness in interactive areas (e.g., the function area 14) but also increase energy efficiency by reducing power usage in less interactive areas (e.g., the on-vehicle display area 16) of the touch panel 1.

The multi-area scanning scheme may be useful in video streaming applications as well as various other types of applications. By implementing the multi-area scanning scheme, the touch panel 1 remains highly responsive in the interactive areas where user interaction is expected, ensuring that essential touch inputs are accurately detected and processed. Meanwhile, the less interactive areas, such as the video display areas of the touch panel 1, reduce or disable touch detection to conserve energy, enhancing the overall energy efficiency of the touch device while maintaining a seamless user experience.

In some embodiments, a multi-area refresh scheme may be implemented alongside the multi-area scanning scheme to further optimize the performance and energy efficiency of the touch panel 1. The multi-area refresh scheme involves setting different refresh rates for various display areas on the touch panel 1. For example, a first display area of the touch panel 1 that show dynamic content, such as animations or video playback, may require higher refresh rates to ensure smooth visual presentation, while a second display area of the touch panel 1 that displays static content, such as menus or status bars, may operate at lower refresh rates to conserve power. The implementation of this multi-area refresh scheme may be independent of the multi-area scanning scheme. This means that the areas of the touch panel 1 having different refresh rates do not necessarily correspond to the areas having different scan rates. For instance, an area of the touch panel 1 may have a high refresh rate to display video content smoothly, while the same area may have a low scan rate if it does not require frequent touch inputs. Conversely, an area having frequent touch interactions, such as a control panel, may have a high scan rate but a lower refresh rate if the displayed content is relatively static. The multi-area scanning scheme and multi-area refresh scheme can enhances the overall user experience by maintaining high responsiveness where needed and conserving energy where possible, ultimately leading to a more efficient and effective touch device.

Figure 2:
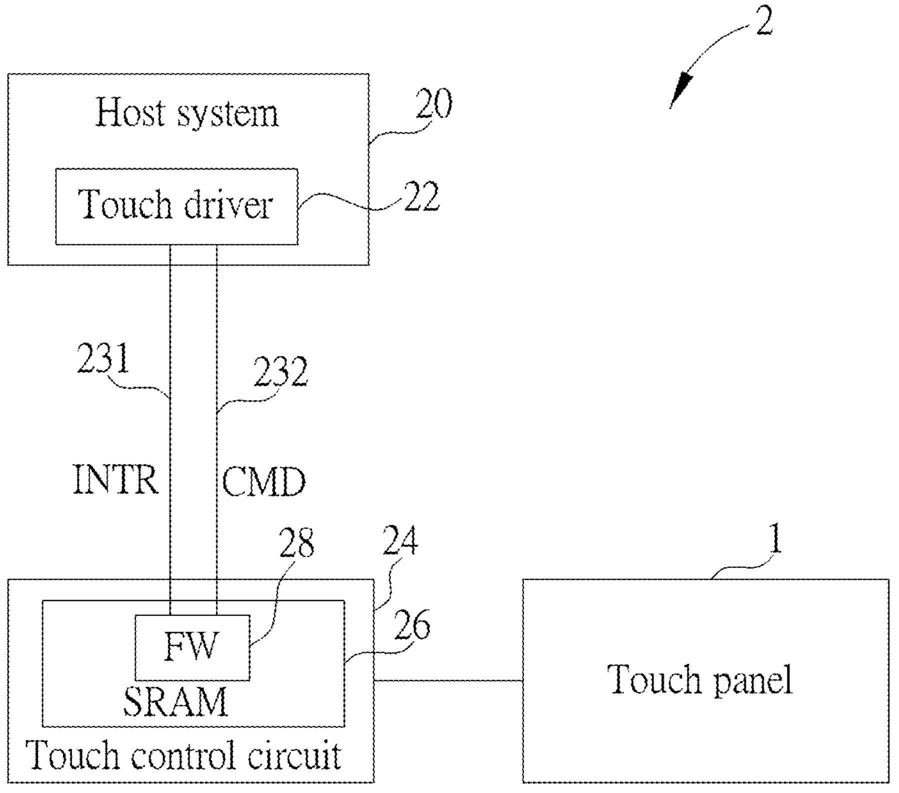
FIG. 2 is a block diagram of a touch device according to an embodiment of the invention.

FIG. 2 is a block diagram of a touch device 2 according to an embodiment of the invention. The touch device 2 may be a smartphone, a tablet, an on-vehicle display device, or other device that incorporates the touch panel 1. The touch device 2 may include a host system 20, a touch control circuit 24, and the touch panel 1. The host system 20 may have a touch driver 22 installed therein. The touch control circuit 24 may include a static random access memory (SRAM) 26 having firmware (FW) 28 stored therein. The host system 20 may be coupled to the touch control circuit 24 via a line 231 and bus lines 232. The touch control circuit 24 may be coupled to the touch panel 1.

The host system 20 may include both software and hardware components, such as an operating system and a processor, so as to manage the functionalities of the touch device 2. The touch driver 22 may be a software component bridging between the operating system and the touch control circuit 24, translating the operating system's instructions into specific commands CMD that the touch control circuit 24 can interpret and execute, thereby enabling the touch interactive operations. The firmware 28 may facilitate scan operations of the touch panel 1. The bus lines 232 may be inter-integrated circuit (I2C) or serial peripheral interface (SPI) bus lines transmitting commands CMD between the host system 20 and the touch control circuit 24. The touch control circuit 24 may include a hardware component to detect touch inputs on the touch panel 1, identifying the occurrence and precise location of each touch. Further, the touch control circuit 24 may control the scan methods or scan rates for different areas of the touch panel 1, realizing the multi-area scanning scheme. Furthermore, the touch control circuit 24 may transmit the locations of touch inputs on the touch panel 1 via an interrupt signal INTR on the line 231 to the host system 20, allowing the touch device 2 to respond appropriately to the touch inputs.

In some embodiments, the host system 20 may identify distinct areas of the touch panel 1 that require different sensitivity levels based on the active applications. In other embodiments, the touch control circuit 24 may employ a machine learning model to automatically determine the distinct areas of the touch panel 1 that require different sensitivity levels based on usage patterns and application contexts. The firmware 28 may further configure scan methods or scan rates of the distinct areas. The touch control circuit 24 may then adjust the sensitivity levels across the distinct areas of the touch panel 1 according to the scan methods or scan rates. The scan methods may be the 2-dimensional (2D) scan, the 1-dimensional (1D) scan, and no scan. In the 2D scan, the touch control circuit 24 scans each individual touch sensor across the touch panel 1 to generate a grid of touch data points, providing detailed information about the exact locations and the intensities of touch inputs. In the 1D scan, the touch control circuit 24 scans either the entire horizontal or vertical electrode at once to generate one data point per electrode, without distinguishing the specific location of the touch input along the electrode. While providing less detailed touch information, the 1D scan operates faster and uses less power than the 2D scan. The scan rate refers to how frequently the touch sensor or a line of touch sensors are read, whether in the 1D or 2D scan.

Figure 3:
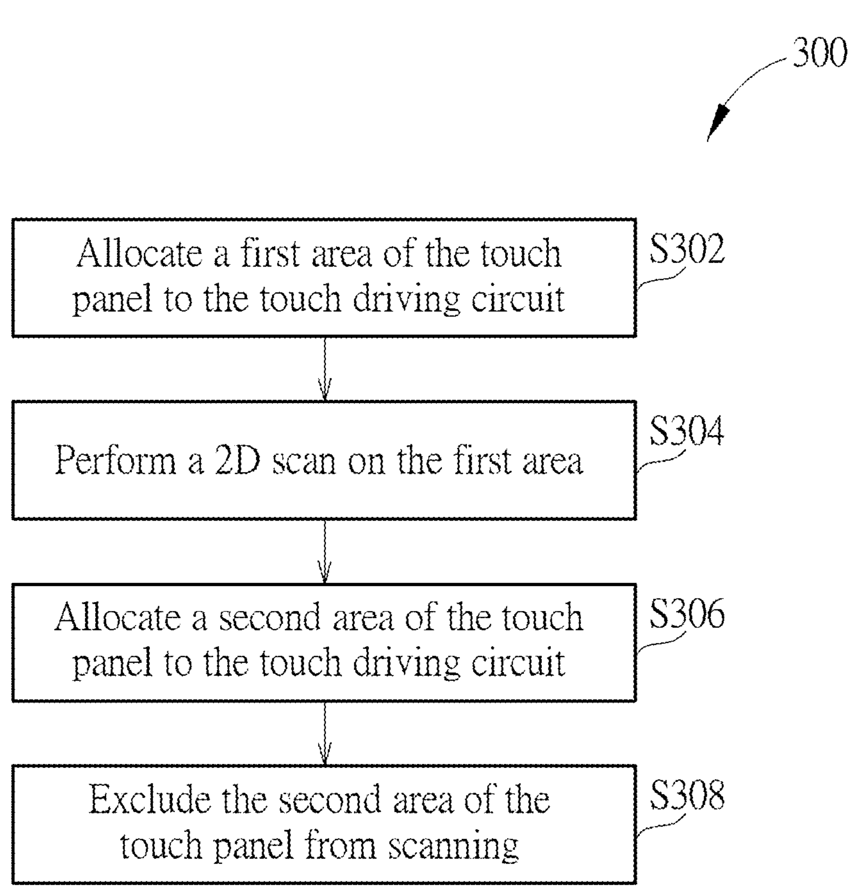
FIG. 3 is a flowchart of a method for use by the touch device to operate the touch panel in FIG. 2, according to an embodiment of the invention.

FIG. 3 is a flowchart of a method 300 for use by the touch device 2 to operate the touch panel 1, according to an embodiment of the invention. The method 300 includes Steps S302 to S308 to apply different scan methods to different areas of the touch panel 1, thereby enabling the multi-area scanning scheme. Any reasonable step change or adjustment is within the scope of the present disclosure. Steps S302 to S308 are detailed as follows:

Step S302: Allocate a first area of the touch panel to the touch control circuit;

Step S304: Perform a 2D scan on the first area;

Step S306: Allocate a second area of the touch panel to the touch control circuit;

Step S308: Exclude the second area from scanning.

In Steps S302 and S306, either the host system 20 or the touch control circuit 24 dynamically allocates the first and second areas of the touch panel 1 for efficient scanning. The first area is designated based on applications and/or usage patterns, often representing regions of the touch panel 1 where user interaction is expected. The second area, by contrast, is a region where touch inputs is not anticipated.

In Step S304, the touch control circuit 24 performs a 2D scan on the first area to measure either the mutual capacitance or self-capacitance of each touch sensor therein, thereby determining the exact locations and touch intensities of touch inputs. The 2D scan in the first area ensures responsiveness and accuracy, providing a smooth user experience. In some embodiments, the touch control circuit 24 may be a touch display driver integrated circuit (TDDI) integrated with the display panel 1. The integration reduces the number of circuit components and interconnect layers, provides thinner and brighter displays, reduces power consumption, and increases touch responsiveness. In cases where the touch control circuit 24 is the TDDI, the 2D self-capacitance of each touch sensor in the first area may be measured. In other embodiments, the touch control circuit 24 may be an external touch driver integrated circuit (IC) separated from the display panel 1. The external placement provides easier maintenance and potential component upgrade or replacement without affecting the display panel 1, offering more flexibility in design and allow for more advanced touch processing capabilities. In cases where the touch control circuit 24 is the external touch deriver, the 2D mutual capacitance of each touch sensor in the first area may be measured.

In Step S308, the touch control circuit 24 performs no scan on the second area. The multi-area scanning scheme reduces or minimizes unnecessary power consumption by avoiding frequent checks in the second area where user interaction is unlikely. By reducing the scanning frequency or omitting scans entirely in these low-activity areas, the touch device 2 conserves energy while maintaining the overall user experience. This intelligent allocation of hardware and computational resources enhances the energy efficiency without compromising the responsiveness or accuracy of the first area.

Figure 4:
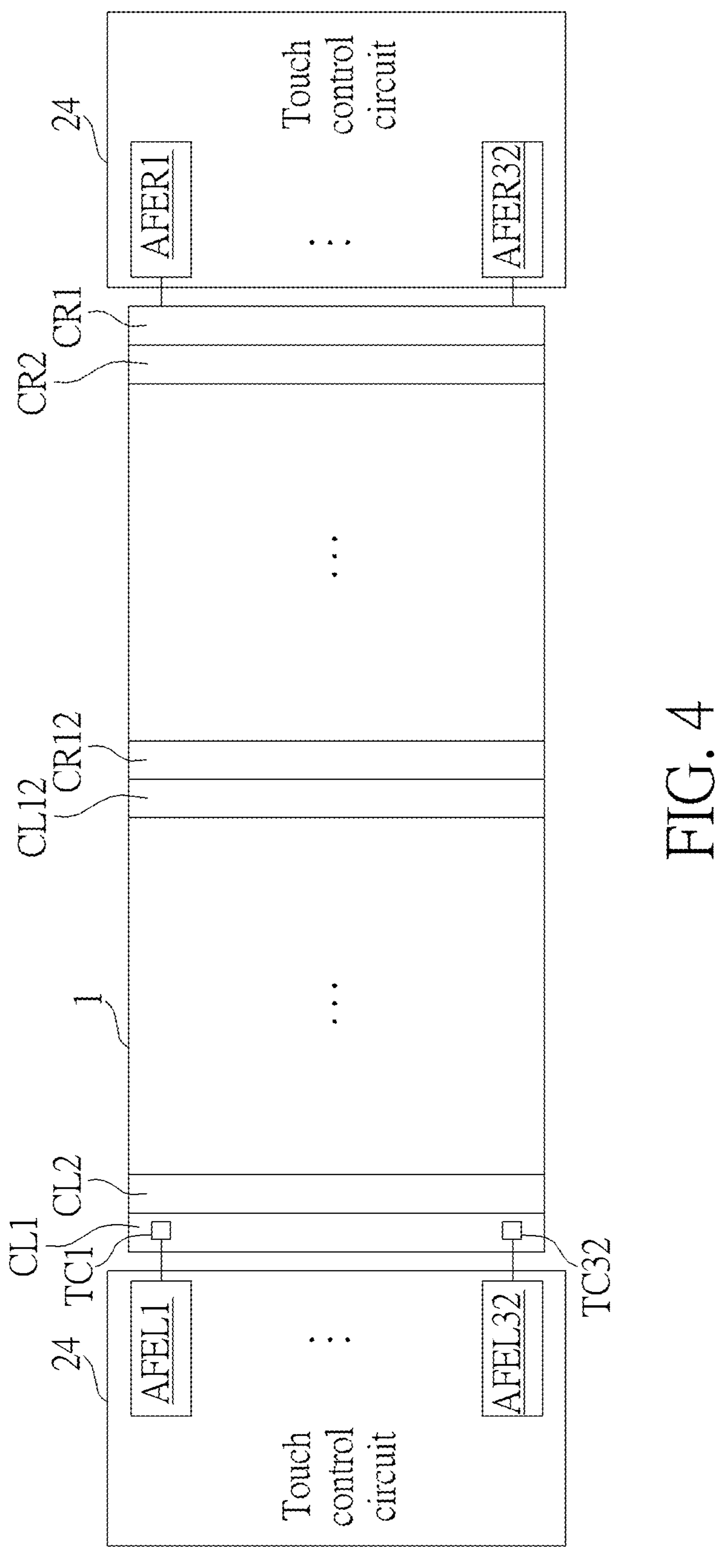
FIG. 4 is schematic diagram of the touch control circuit and the touch panel in FIG. 2, according to an embodiment of the invention.

FIG. 4 is schematic diagram of the touch panel 1, where the TDDI serving as the touch control circuit 24 according to an embodiment of the invention.

The touch panel 1 may be divided into left and right halves. The left half of the touch panel 1 may include, but not limited to, 12 vertical electrodes (CL1 to CL12), and the right half of the touch panel 1 may include, but not limited to, 12 vertical electrodes (CR1 to CR12). Each vertical electrode may include, but is not limited to, 32 touch sensors (TC1 to TC32) arranged sequentially.

The touch control circuit 24 may include, but is not limited to, 32 analog front ends (AFEL1 to AFEL32), and 32 analog front ends (AFER1 to AFER32). The analog front ends AFEL1 to AFEL32 may be coupled to the vertical electrodes CL1 to CL12. In some embodiments, each analog front end may include an analog-to-digital converter (ADC) coupled to a specific touch sensor on each of the vertical electrodes CL1 to CL12, converting analog signal from the touch sensor into digital data. For example, the analog front end AFEL1 may be coupled to the touch sensor TC1 on each of the vertical electrodes CL1 to CL12, while the analog front end AFEL32 may be coupled to the touch sensor TC32 on each of the vertical electrodes CL1 to CL12.

Likewise, the analog front ends AFER1 to AFER32 may be coupled to the vertical electrodes CR1 to CR12, and each analog front end may be coupled to a specific touch sensor on each of the vertical electrodes CR1 to CR12. For example, the analog front end AFER1 may be coupled to the touch sensor TC1 on each of the vertical electrodes CR1 to CR12, while the analog front end AFER32 may be coupled to the touch sensor TC32 on each of the vertical electrodes CR1 to CR12.

During a 2D scan, the touch control circuit 24 may measure self-capacitance at each touch sensor in the selected area. In the embodiment, the analog front ends AFEL1 to AFEL32 may send electrical signals to the touch sensor TC1 to TC32 on a selected vertical electrode. Subsequently, the analog front ends AFEL1 to AFEL32 may read 32 capacitance readings from the touch sensor TC1 to TC32 on the same vertical electrode. In some embodiments, the analog front ends AFEL1 to AFEL32 may read from the touch sensor TC1 to TC32 on the selected vertical electrode on the left half of the touch panel 1 simultaneously with the analog front ends AFER1 to AFER32 reading from the touch sensor TC1 to TC32 on the matching vertical electrodes on the right half of the touch panel 1, thereby speeding up the 2D process. For example, the analog front ends AFEL1 to AFEL32 may read from the touch sensor TC1 to TC32 on the vertical electrode CL1 simultaneously with the analog front ends AFER1 to AFER32 reading from the touch sensor TC1 to TC32 on the vertical electrode CR1. If a finger touches a touch sensor, the local electrostatic field would be disrupted at the point of contact, changing the capacitance of the specific touch sensor being touched. The touch control circuit 24 may process the 32 capacitance readings to identify a touch point, convert the location of the touch point into coordinates on the touch panel 1, and transmit the coordinates of the touch point to the host system 20. The touch control circuit 24 may perform the 2D scan on all selected columns to generate the coordinates of all touch inputs, and the host system 20 may interpret the touch inputs and respond accordingly. The 2D scan process enables accurate and responsive touch detection, ensuring smooth interaction with the touch panel 1.

Figure 5:
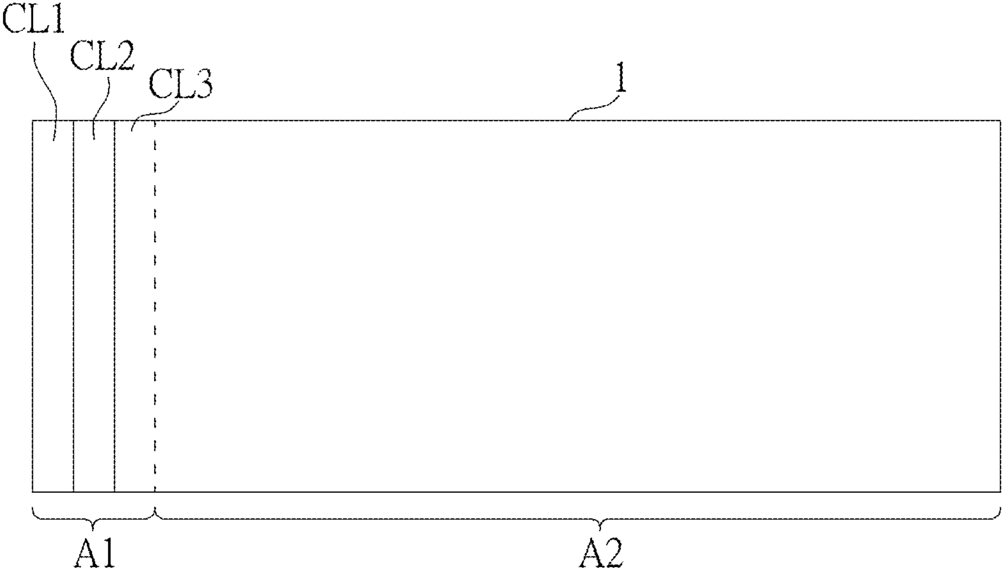
FIG. 5 is schematic diagram of the touch panel in FIG. 4 adopting the method in FIG. 3, according to an embodiment of the invention.
Figure 6:
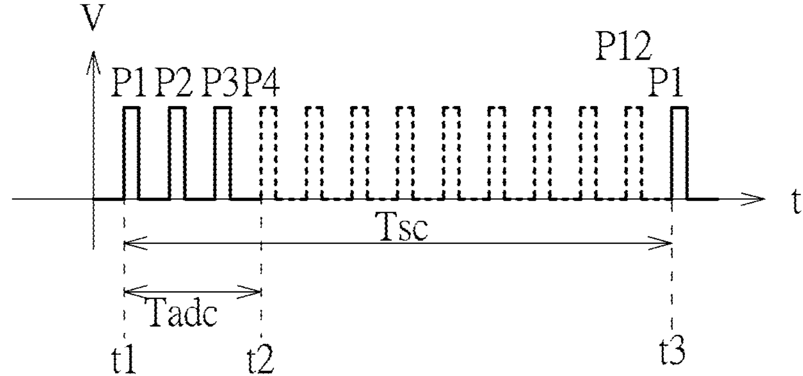
FIG. 6 is timing diagram of the touch panel in FIG. 4 adopting the method in FIG. 3, according to an embodiment of the invention.

The method 300 may be exemplified with reference to FIGS. 5 and 6. FIG. 5 is schematic diagram of the touch panel 1 in FIG. 4 adopting the method 300, according to an embodiment of the invention. FIG. 6 is timing diagram of the touch panel 1 in FIG. 4 adopting the method 300, according to an embodiment of the invention, where the horizontal axis represents time t, and the horizontal axis represents voltage V.

The touch device 2 allocates the first area A1 of the touch panel 1 to the touch control circuit 24 (S302). The first area A1 includes the vertical electrodes CL1 to CL3. The touch control circuit 24 performs a 2D scan on the first area A1 (S304) by the analog front ends AFEL1 to AFEL32 transmitting 2D scan patterns P1 to P3 to the touch sensors TC1 to TC32 on the vertical electrodes CL1 to CL3, respectively. The analog front ends AFEL1 to AFEL32 measure 32 capacitance readings for the touch sensors on each vertical electrode, generating a total of 96 capacitance readings (3 columns×32 readings) between Time t1 and Time t2, ensuring smooth touch operations. The interval between Time t1 and Time t2 may be referred to as a 2D scan period Tadc.

The touch device 2 allocates the second area A2 of the touch panel 1 to the touch control circuit 24 (S306). The second area A2 includes the remaining vertical electrodes CL4 to CL12 and CR1 to CR12. The touch control circuit 24 excludes the second area A2 from scanning (S308). In other words, the touch control circuit 24 does not send 2D scan patterns P1 to P3 to the vertical electrodes CR1 to CR3 between Time t1 and Time t2, nor 2D scan patterns P4 to P12 to the vertical electrodes CL4 to CL12 and CR4 to CR12 between Time t2 and Time t3, conserving energy in the second area A2. The interval between Time t1 and Time t3 may be referred to as a scan period Tsc.

Figure 7:
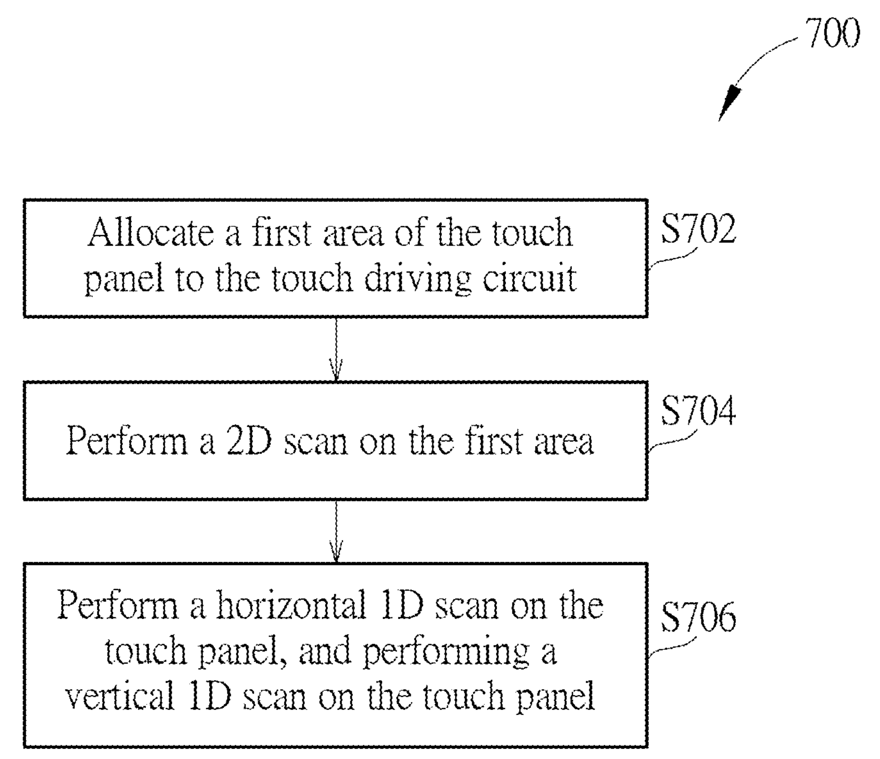
FIG. 7 is a flowchart of a method for use by the touch device to operate the touch panel in FIG. 2, according to another embodiment of the invention.

FIG. 7 is a flowchart of a method for use by the touch device 2 to operate the touch panel 1, with the external touch driver IC functioning as the touch control circuit 24. The method 700 includes Steps S702 to S706 to apply different scan methods to different areas of the touch panel 1, thereby enabling the multi-area scanning scheme. Any reasonable step change or adjustment is within the scope of the present disclosure. Steps S702 to S706 are detailed as follows:

Step S702: Allocate a first area of the touch panel to the touch control circuit;

Step S704: Perform a 2D scan on the first area;

Step S706: Perform a horizontal 1D scan and a vertical 1D scan across the entire touch panel.

Step S702 is similar to Step S302 and the explanation thereof will be omitted here for brevity. In Step S704, the touch control circuit 24 performs a 2D scan to measure mutual-capacitance at each touch sensor in the first area. In Step S706, the touch control circuit 24 performs 2 types of 1D scan across the entire touch panel 1. Specifically, the touch control circuit 24 performs a horizontal 1D scan to measure the self-capacitance of each horizontal electrode, and a vertical 1D scan to measure the self-capacitance of each vertical electrode.

The horizontal or vertical 1D scans to measure self-capacitance can be useful for water-proof touch detection. Self-capacitance measurements are less affected by the presence of water on the touch panel 1, making the 1D scans particularly useful in environments where the touch panel 1 might be exposed to moisture or liquids, ensuring reliable touch detection even under challenging conditions.

Figure 8:
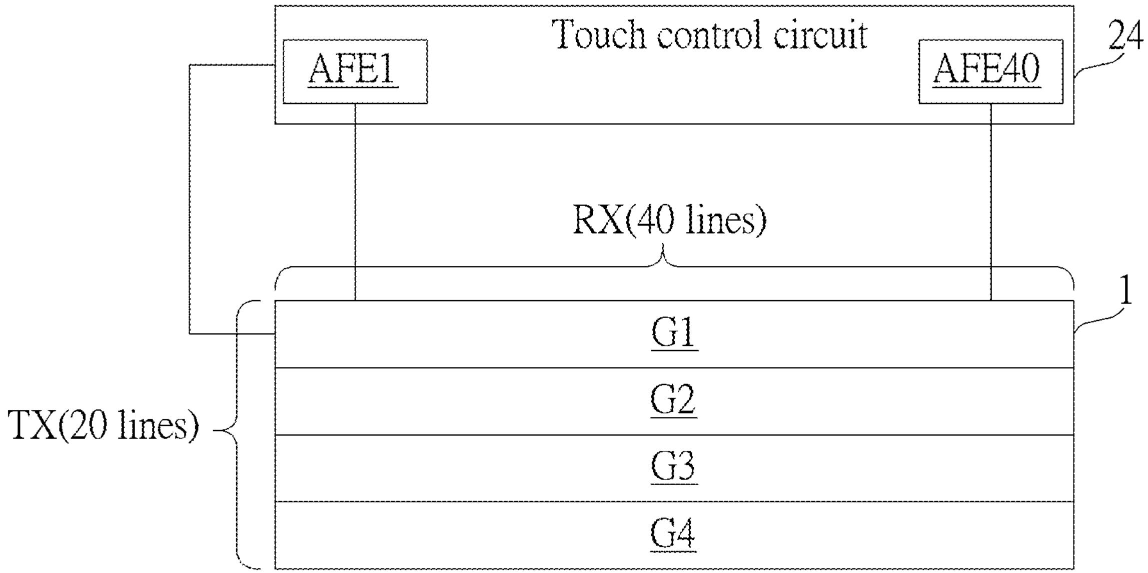
FIG. 8 is schematic diagram of the touch control circuit and the touch panel in FIG. 2, according to another embodiment of the invention.

FIG. 8 is schematic diagram of the touch panel land the touch control circuit 24 according to another embodiment of the invention. The external touch driver IC serves as the touch control circuit 24. The touch panel 1 may include a grid of 40×20 touch sensors, arranged into 20 horizontal electrodes and 40 vertical electrodes. The touch sensors may be divided into 4 groups, labeled G1 to G4. Each group includes 5 horizontal electrodes, and each horizontal electrode intersects with 40 vertical electrodes, forming 40 touch sensors at the crossover points.

The touch control circuit 24 may include 40 analog front ends (AFE1 to AFE40), each analog front end being coupled to a vertical electrode. For example, the analog front end AFE1 is coupled to the first vertical electrode, while the analog front end AFE40 is coupled to the 40th vertical electrode. The arrangement ensures that each vertical electrode is individually monitored and controlled by a corresponding analog front end.

During a 2D scan, the touch control circuit 24 may scan the touch panel 1 group by group. The groups G1 to G4 are scanned in sequence. The touch control circuit 24 may transmit an electrical signal to a selected horizontal electrode, prompting the analog front ends AFE1 to AFE40 to measure the capacitance from the touch sensors on the horizontal electrode. For example, when scanning the group G1, the touch control circuit 24 transmits an electrical signal to each of the five horizontal electrodes sequentially. The analog front ends AFE1 to AFE40 then measure 40 capacitance readings from the 40 touch sensors on the horizontal electrode, resulting in a total of 200 readings for the group G1 (5 horizontal electrodes×40 readings). This 2D scan process is repeated for the groups G2 to G4, ensuring a comprehensive 2D scan of the entire touch panel 1. The touch control circuit 24 may process the capacitance readings to identify a touch point, convert the location of the touch point into coordinates on the touch panel 1, and transmit the coordinates of the touch point to the host system 20. The host system 20 may interpret the touch input and respond accordingly. The 2D scan process enables accurate and responsive touch detection, ensuring smooth interaction with the touch panel 1.

During a horizontal 1D scan, the touch control circuit 24 sends an electrical signal to a horizontal electrode and an analog front end measures the self-capacitance of the horizontal electrode. For example, the touch control circuit 24 may sends an electrical signal to the first horizontal electrode in the group G1, and the analog front end AFE1 may measures the self-capacitance of the first horizontal electrode. Similarly, during a vertical 1D scan, the touch control circuit 24 sends an electrical signal to a vertical electrode and an analog front end measures the self-capacitance of the vertical electrode. For example, the touch control circuit 24 may sends an electrical signal to the first vertical electrode passing through the groups G1 to G4, and the analog front end AFE1 may measures the self-capacitance of the first vertical electrode. When a finger approaches or touches a horizontal or vertical electrode, the self-capacitance would change, indicating a touch input.

Figure 9:
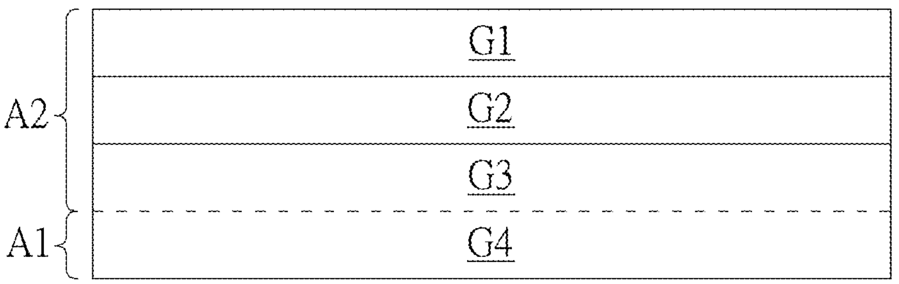
FIG. 9 is schematic diagram of the touch panel in FIG. 8 adopting the method in FIG. 7, according to an embodiment of the invention.
Figure 10:
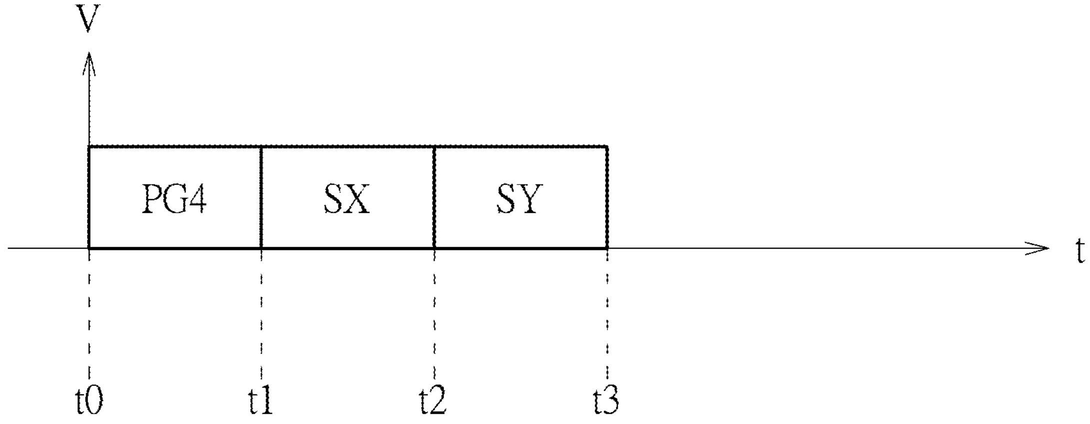
FIG. 10 is timing diagram of the touch panel in FIG. 8 adopting the method in FIG. 7, according to an embodiment of the invention.

The method 700 may be exemplified with reference to FIGS. 9 and 10. FIG. 9 is schematic diagram of the touch panel 1 in FIG. 8 adopting the method 700, according to an embodiment of the invention. FIG. 10 is timing diagram of the touch panel 1 in FIG. 8 adopting the method 700, according to an embodiment of the invention, where the horizontal axis represents time t, and the horizontal axis represents voltage V.

The touch device 2 allocates the first area A1 of the touch panel 1 to the touch control circuit 24 (S702). The first area A1 includes the group G4. The touch control circuit 24 performs a 2D scan on the first area A1 (S704) by applying a 2D scan pattern PG4 to the 5 horizontal electrodes of the group G4, and in response, the analog front ends AFE1 to AFE40 measure 40 capacitance readings for the 40 touch sensors on each horizontal electrode in the group G4, generating a total of 200 capacitance readings between Time t0 and Time t1, ensuring smooth touch operations.

The touch control circuit 24 performs a horizontal 1D scan and a vertical 1D scan across the entire touch panel 1 (S706). Between Time t1 and Time t2, the touch control circuit 24 sends an electrical signal to the horizontal electrode and measures the self-capacitance to detect an input touch. Between Time t2 and Time t3, the process between Time t1 and Time t2 is repeated for the vertical electrodes on the entire touch panel 1 to detect the presence of a touch.

Figure 11:
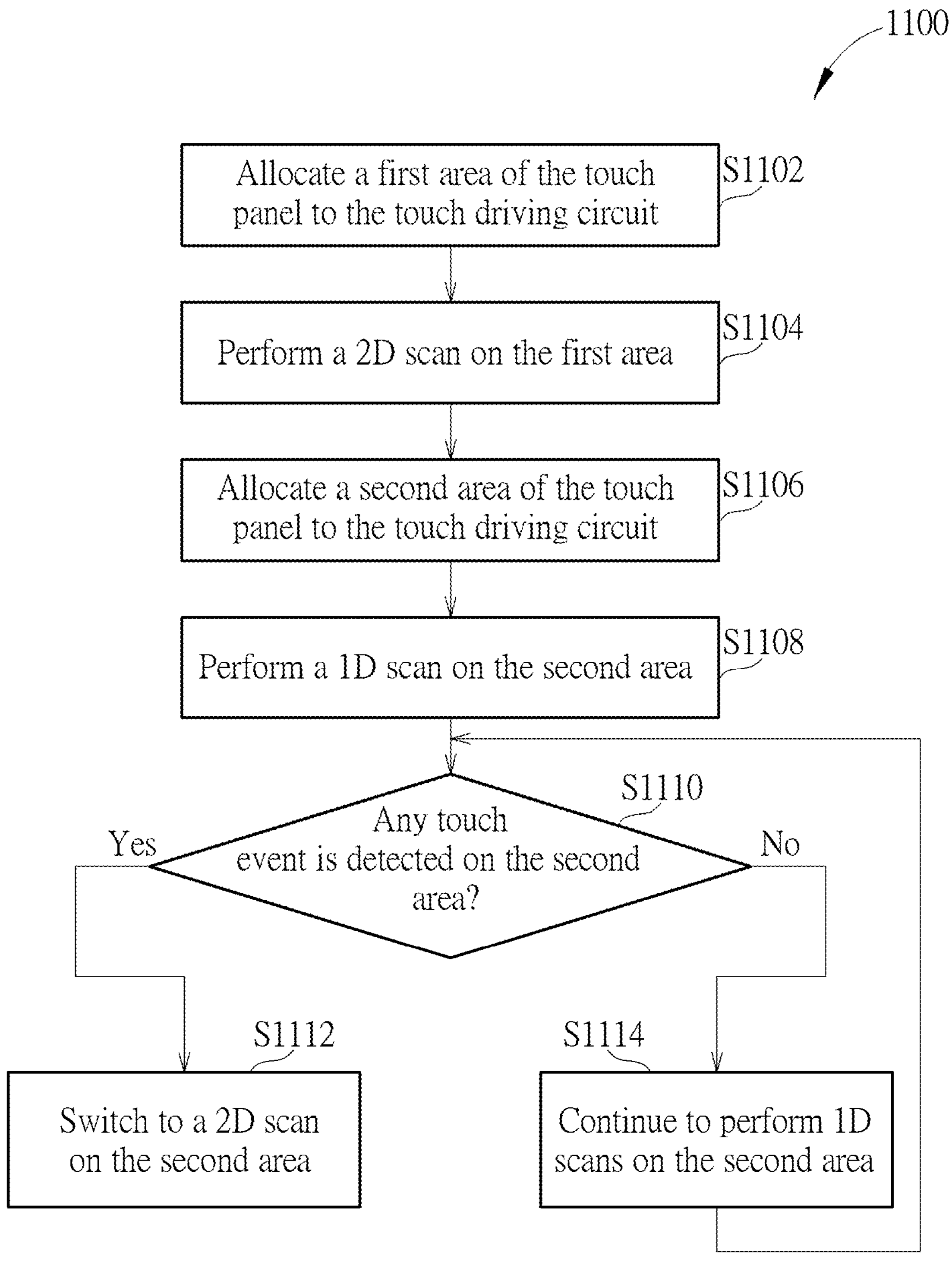
FIG. 11 is a flowchart of a method for use by the touch device to operate the touch panel in FIG. 2, according to another embodiment of the invention.

FIG. 11 is a flowchart of a method 1100 for use by the touch device 2 to operate the touch panel 1, according to another embodiment of the invention. The method 1100 includes Steps S1102 to S1114 to apply different scan methods to different areas of the touch panel 1, thereby enabling the multi-area scanning scheme. Any reasonable step change or adjustment is within the scope of the present disclosure. Steps S1102 to S1114 are detailed as follows:

Step S1102: Allocate a first area of the touch panel to the touch control circuit;

Step S1104: Perform a 2D scan on the first area;

Step S1106: Allocate a second area of the touch panel to the touch control circuit;

Step S1108: Perform a 1D scan on the second area;

Step S1110: Determine whether any touch input is detected on the second area? if so, go to Step S1112; if not, go to Step S1114;

Step S1112: Switch to a 2D scan on the second area;

Step S1114: Continue to perform 1D scans on the second area; go to Step S1010.

Steps S1102 to S1106 are similar to Steps S302 and S306 and the explanation thereof will be omitted here for brevity. In Step S1108, the touch control circuit 24 performs a 1D scan on the second area to obtain the capacitance readings. In Step S1110, the touch control circuit 24 determines the presence or absence of a touch input according to the capacitance readings from the 1D scan? If a touch input is detected, the touch control circuit 24 adaptively switches to a 2D scan on the second area (S1112), obtaining the detailed location of the input touch. If no touch input is detected, the touch control circuit 24 continues to perform 1D scans on the second area (S1114) until a touch input is detected.

Figure 12:
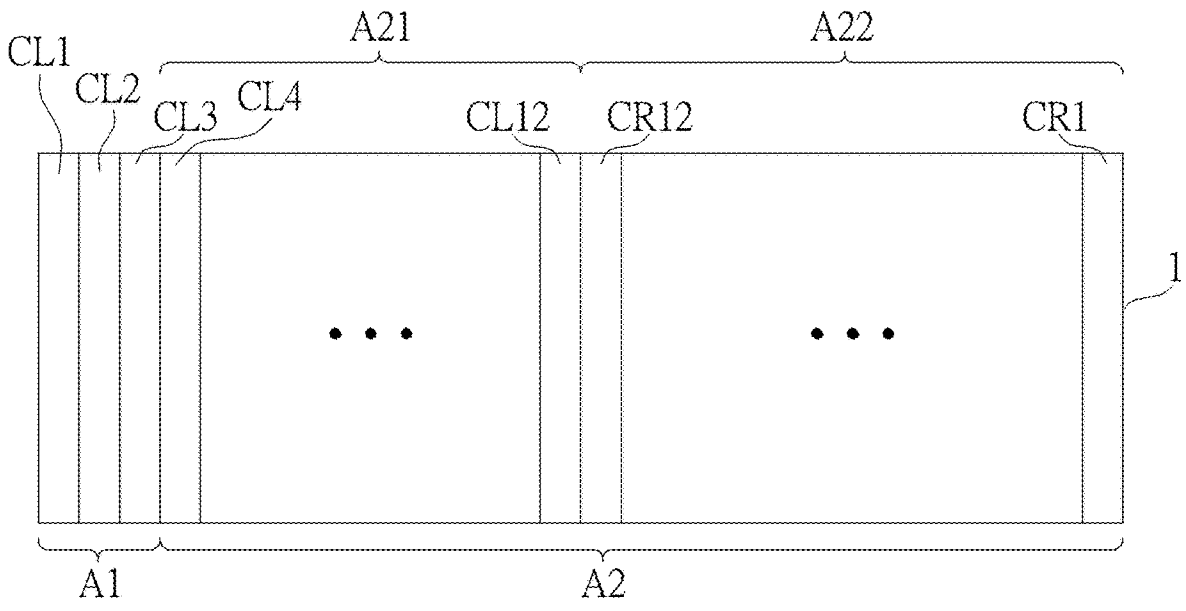
FIG. 12 is schematic diagram of the touch panel in FIG. 4 adopting the method in FIG. 11, according to an embodiment of the invention.
Figure 13:
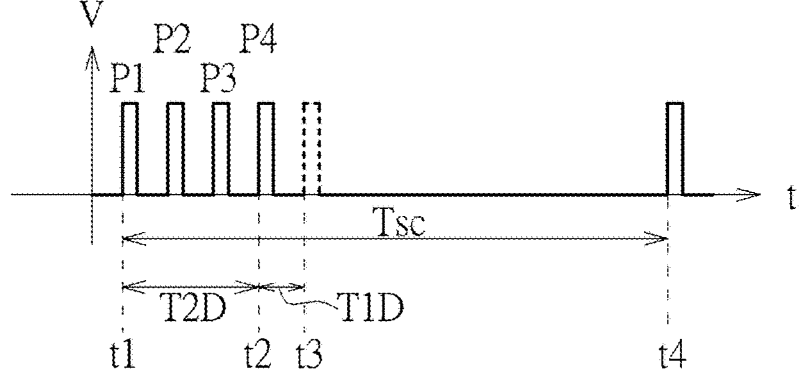
FIG. 13 is timing diagram of the touch panel in FIG. 4 adopting the method in FIG. 11, according to an embodiment of the invention.

The method 1100 may be exemplified with reference to FIGS. 12 and 13. FIG. 12 is schematic diagram of the touch panel 1 in FIG. 4 adopting the method 1100, according to an embodiment of the invention. FIG. 13 is timing diagram of the touch panel 1 in FIG. 4 adopting the method 1100, according to an embodiment of the invention, where the horizontal axis represents time t, and the horizontal axis represents voltage V.

The touch device 2 allocates the first area A1 of the touch panel 1 to the touch control circuit 24 (S1102). The first area A1 includes the vertical electrodes CL1 to CL3. At Time t1, a scan period Tsc starts, and the touch control circuit 24 performs a 2D scan on the first area A1 (S1104) by the analog front ends AFEL1 to AFEL32 each transmitting 2D scan patterns P1 to P3 to the vertical electrodes CL1 to CL3. In response, the analog front ends AFEL1 to AFEL32 measure 32 capacitance readings for the 32 touch sensors on each vertical electrode, generating a total of 96 capacitance readings (3 columns×32 readings) between Time t1 and Time t2, ensuring smooth touch operations. The interval between Time t1 and Time t2 may be referred to as a 2D scan period T2D.

The touch device 2 allocates the second area A2 of the touch panel 1 to the touch control circuit 24 (S1106). The second area A2 includes subareas A21 and A22, where the subarea A21 contains vertical electrodes CL4 to CL12, while the subarea A22 contains vertical electrodes CR1 to CR12. Next, the touch control circuit 24 applies a 1D scan to the second area A2 (S1108). In the 1D scan process for the subarea A21, a selected AFE in the touch control circuit 24 sends a 1D scan pattern P4 to the vertical electrodes CL4 to CL12 sequentially and reads 9 capacitance readings from the vertical electrodes CL4 to CL12 between Time t2 and Time t3. In some embodiments, the selected AFE in the touch control circuit 24 sends a 1D scan pattern P4 to the vertical electrodes CL1 to CL12 sequentially to read 12 capacitance readings from the vertical electrodes CL1 to CL12 between Time t2 and Time t3. At Time t4, a scan period Tsc is completed. The interval between Time t2 and Time t3 may be referred to as a 1D scan period T1D. During the 1D scan period, the 1D scan process may be repeated again for the vertical electrodes CR1 to CR12 in the subareas A22 to read 12 capacitance readings.

Next, the touch control circuit 24 detects a touch input according to the 21 capacitance readings from the vertical electrodes CL4 to CL12 and CR1 to CR12 (S1110). If no touch input is detected, the touch control circuit 24 continues to perform 1D scans on the second area A2 (S1114) until a touch input is detected. If a touch input is detected, the touch control circuit 24 adaptively switches to a 2D scan on the second area A2 (S1112), obtaining the precise location of the input touch.

In some embodiments, if a touch input is identified in the subarea A21, the touch control circuit 24 may adaptively switches to a 2D scan on the subarea A21, while continues 1D scans on the subarea A22. Conversely, if a touch input is identified in the subarea A22, the touch control circuit 24 may adaptively switches to a 2D scan on the subarea A22, while continues 1D scans on the subarea A21. In other embodiments, upon detecting an input touch, the touch control circuit 24 may adaptively switches to a 2D scan on the entire second area A2, regardless of whether the touch input is in the subareas A21 or A22.

The method 1100 may be further exemplified by the external touch driver IC with reference to FIGS. 9 and 10.

The touch device 2 allocates the first area A1 of the touch panel 1 to the touch control circuit 24 (S1102). The first area A1 includes the group G4. The touch control circuit 24 performs a 2D scan on the first area A1 (S1104) by applying a 2D scan pattern PG4 to the 5 horizontal electrodes of the group G4, and in response, the analog front ends AFE1 to AFE40 measure 40 capacitance readings for the 40 touch sensors on each horizontal electrode in the group G4, generating a total of 200 capacitance readings between Time t0 and Time t1, ensuring smooth touch operations.

The touch device 2 allocates the second area A2 of the touch panel 1 to the touch control circuit 24 (S1106), and the touch control circuit 24 applies a horizontal 1D scan and a vertical 1D scan to the entire touch panel 1, the entire touch panel 1 including both the first area A1 and the second A2 (S1108). Between Time t1 and Time t2, the touch control circuit 24 sends an electrical signal to 20 the horizontal electrode and measures 20 self-capacitance accordingly. Between Time t2 and Time t3, the process between Time t1 and Time t2 is repeated for the 40 vertical electrodes on the entire touch panel 1 to measure 40 self-capacitance accordingly.

Next, the touch control circuit 24 detects a touch input according to the 60(20+40) capacitance readings obtained from the horizontal and vertical 1D scans (S1110). If no touch input is detected, the touch control circuit 24 continues to perform horizontal and vertical 1D scans on the entire touch panel 1 (S1114) until a touch input is detected. If a touch input is detected, the touch control circuit 24 adaptively switches to a 2D scan on the second area A2 (S1112), obtaining the precise location of the input touch.

In some embodiments, if a touch input is identified in a specific group in the second area A2, the touch control circuit 24 may adaptively switches to a 2D scan on the specific group while continuing 1D scans on the remaining groups in subarea A22. In other embodiments, upon detecting an input touch, the touch control circuit 24 may adaptively switches to a 2D scan on the entire second area A2, regardless of the group where the touch input is detected.

Figure 14:
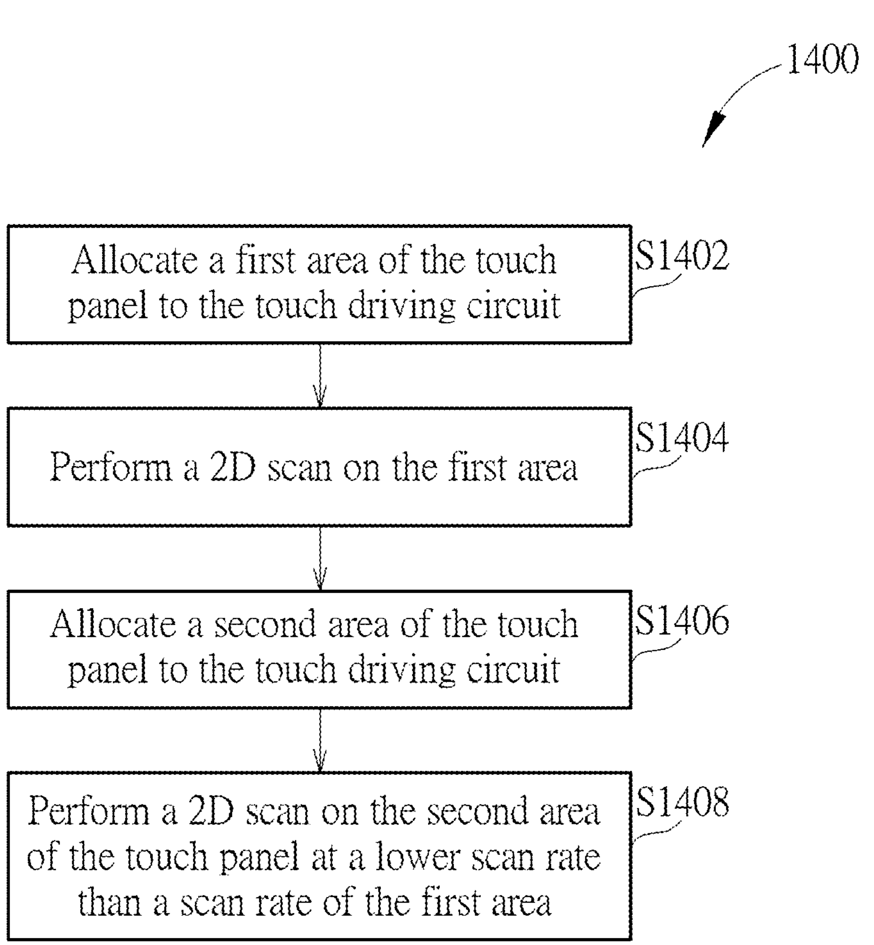
FIG. 14 is a flowchart of a method for use by the touch device to operate the touch panel in FIG. 2, according to another embodiment of the invention.

FIG. 14 is a flowchart of a method 1400 for use by the touch device 2 to operate the touch panel 1, according to another embodiment of the invention. The method 1400 includes Steps S1402 to S1408 to apply different scan rates to different areas of the touch panel 1, thereby enabling the multi-area scanning scheme. Any reasonable step change or adjustment is within the scope of the present disclosure. Steps S1402 to S1408 are detailed as follows:

Step S1402: Allocate a first area of the touch panel to the touch control circuit;

Step S1404: Perform a 2D scan on the first area;

Step S1406: Allocate a second area of the touch panel to the touch control circuit;

Step S1408: Perform a 2D scan on the second area of the touch panel at a lower scan rate than a scan rate of the first area.

Steps S1402 to S1406 are similar to Steps S302 and S306 and the explanation thereof will be omitted here for brevity. In Step S1408, the touch control circuit 24 performs a 2D scan on the second area at a lower scan rate than a scan rate of the first area. Therefore, the touch control circuit 24 checks for touch inputs in the second area at a reduced scan rate, conserving power and reducing processing load.

Figure 15:
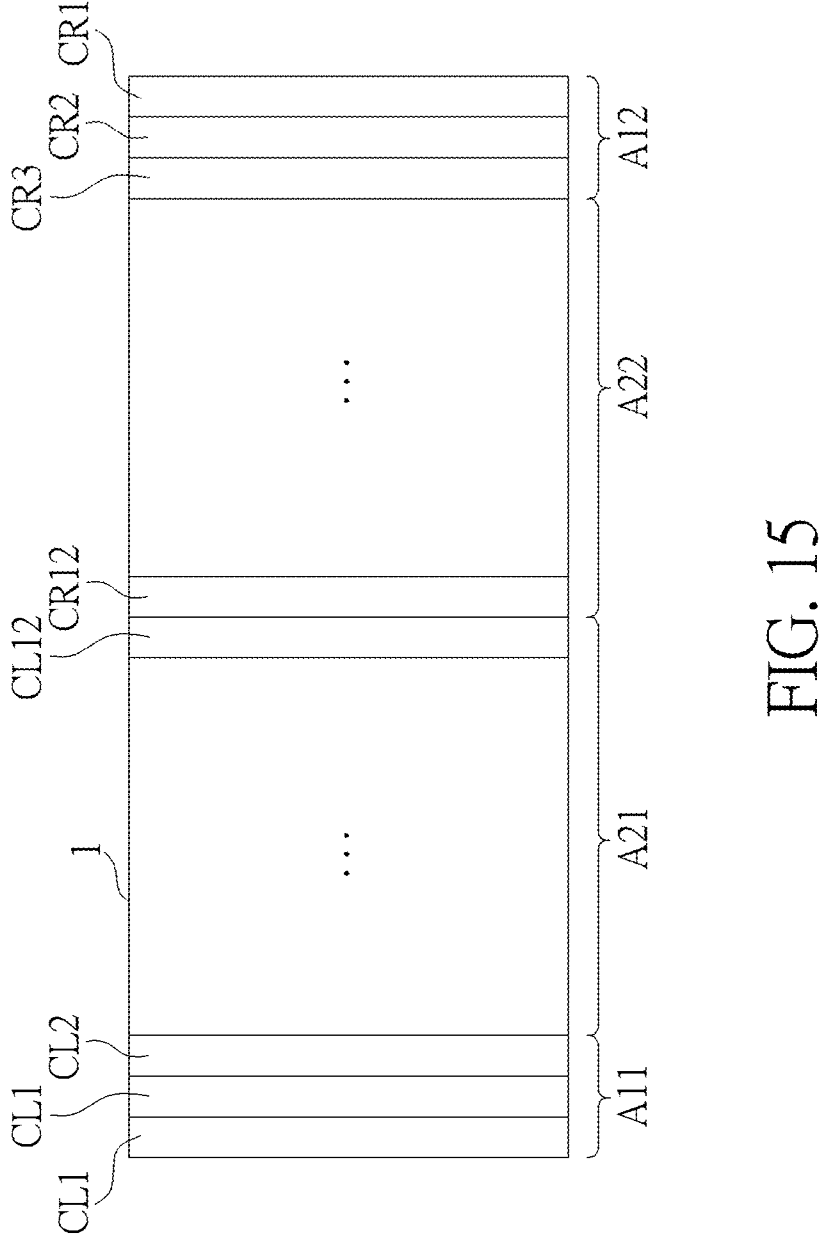
FIG. 15 is schematic diagram of the touch panel in FIG. 4 adopting the method in FIG. 15, according to an embodiment of the invention.
Figure 16A:
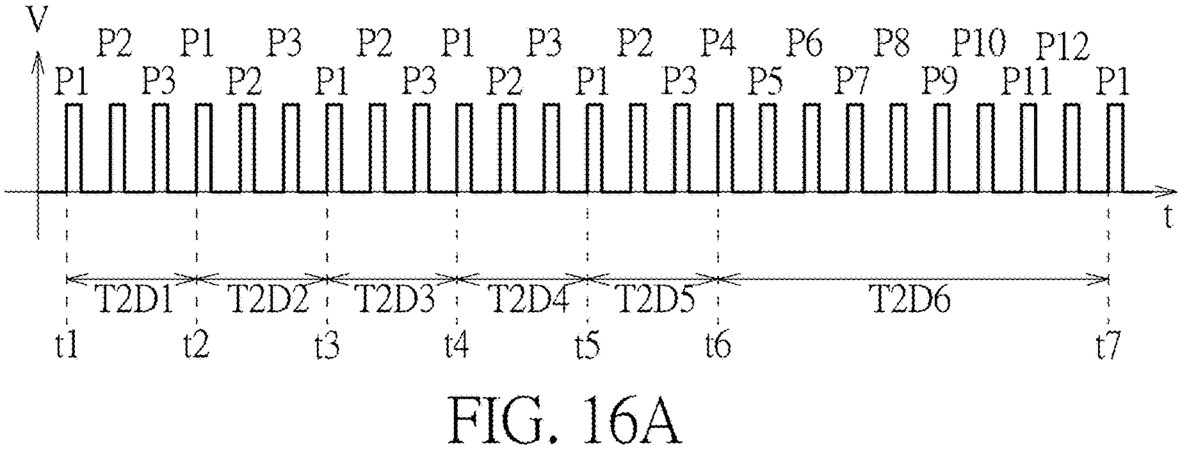
FIGS. 16A to 16C are timing diagrams of the touch panel in FIG. 4 adopting the method in FIG. 15, according to various embodiments of the invention.
Figure 16B:
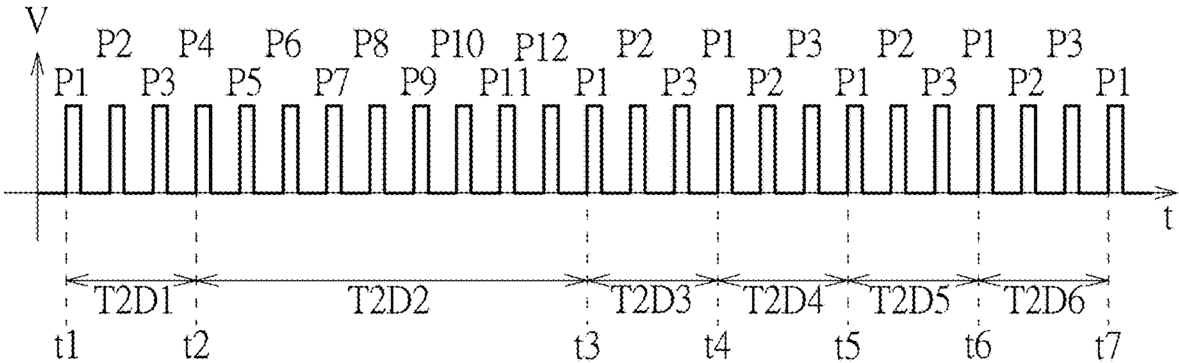
Figure 16C:
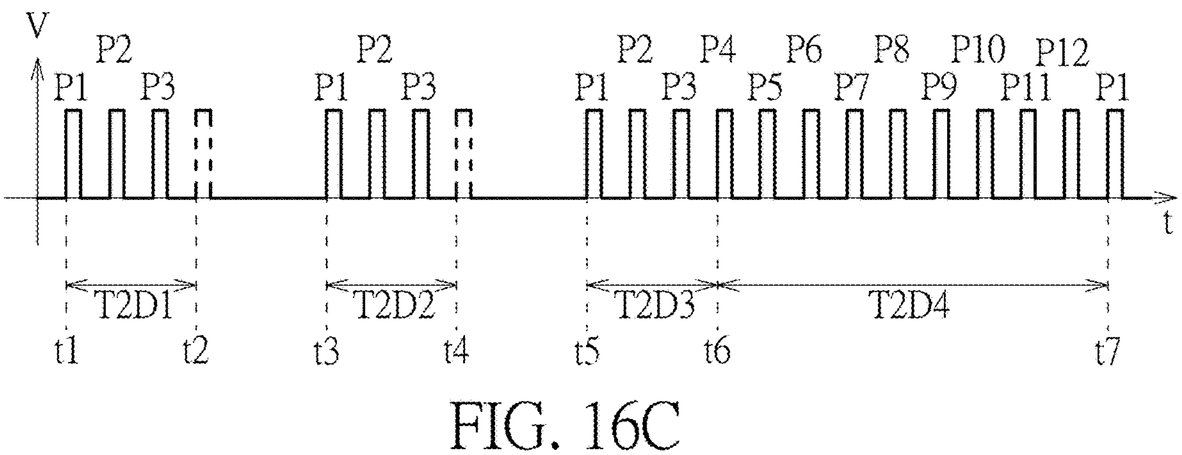

The method 1100 may be exemplified with reference to FIGS. 15 and 16A to 16C. FIG. 15 is schematic diagram of the touch panel 1 in FIG. 4 adopting the method 1400, according to another embodiment of the invention. FIGS. 16A to 16C are timing diagrams of left half of the touch panel 1 in FIG. 4 adopting the method 1400, according to various embodiments of the invention, where the horizontal axis represents time t, and the horizontal axis represents voltage V. In FIG. 15, the touch panel 1 may include a first area A11 and a second area A21 on the left half, as well as a first area A12 and a second area A22 on the right half.

The touch device 2 may allocate the first areas A11 and A12 and the second areas A21 and A22 of the touch panel 1 to the touch control circuit 24 (S1402 and S1406). The first area A11 may include the vertical electrodes CL1 to CL3. The second area A21 may include the vertical electrodes CL4 to CL12. The first area A12 may include the vertical electrodes CR1 to CR3. The second area A22 may include the vertical electrodes CR4 to CR12. In some embodiments, the touch control circuit 24 may scan the first areas A11 and A12 multiple times in succession while only scanning the second areas A21 and A22 once within one or more scan periods, as illustrated in FIGS. 16A and 16B.

In FIGS. 16A and 16B, the touch control circuit 24 scans the first areas A11 and A12 five times while scanning the second areas A21 and A22 only once between Time t1 and Time t7, enhancing sensitivity level in the first areas A11 and A12 while ensuring sufficient touch detection coverage in the second area A2. In FIG. 16A, Time t1 to Time t5 may form a first scan period, while Time t6 to Time t7 may form a second scan period. The time interval between Time t1 and Time t7 may be 1/60 second in duration. Between Time t1 and Time t7, the first areas A11 and A12 are scanned 5 times, indicating a scan rate of 300 Hz for the first areas A11 and A12. In contrast, the second areas A21 and A22 are scanned only once, indicating a scan rate of 60 Hz for the second areas A21 and A22.

Referring to FIG. 16A, the touch control circuit 24 may perform a 2D scan on the first areas A11 and A12 (S1404) by the analog front ends AFEL1 to AFEL32 and AFER1 to AFER32 applying 2D scan patterns P1 to P3 to the vertical electrodes CL1 to CL3 between Time t1 and Time t2 (referred to as a scan period T2D1). In response, the analog front ends AFEL1 to AFEL32 and AFER1 to AFER32 may measure 32 capacitance readings for the 32 touch sensors on each vertical electrode, generating a total of 192 capacitance readings (6 vertical electrodes×32 readings) during the scan period T2D1.

Similarly, between Time t2 and Time t3 (scan period T2D2), Time t3 and Time t4 (scan period T2D3), Time t4 and Time t5 (scan period T2D4), and Time t5 and Time t6 (scan period T2D5), the analog front ends AFEL1 to AFEL32 and AFER1 to AFER32 may repeatedly apply the 2D patterns P1 to P3 to the vertical electrodes CL1 to CL3 sequentially, generating 192 capacitance readings between each scan period. The scan patterns P1 to P3 are driven at the scan rate of 300 Hz in the scan periods T2D1 to T2D5.

Between Time t6 and Time t7 (scan period T2D6), the analog front ends AFEL1 to AFEL32 may apply 2D patterns P4 to P12 respectively to the vertical electrodes CL4 to CL12 while the analog front ends AFER1 to AFER32 applying the 2D patterns P4 to P12 respectively to the vertical electrodes CR4 to CR 12(S1408), generating 576 capacitance readings (18 vertical electrodes×32 readings). The scan patterns P4 to P12 are driven at the scan rate of 60 Hz in the scan period T2D6. The touch control circuit 24 may detect a touch input according to the 1536 capacitance readings (192*5+576).

FIG. 16B is similar to FIG. 16A, except that the 2D patterns P4 to P12 are applied to the vertical electrodes CL4 to CL12 and CR4 to CR12 between Time t2 and Time t3 (scan period T2D2), while the 2D patterns P1 to P3 are repeatedly applied to the vertical electrodes CL1 to CL3 and CR1 to CR3 between Time t1 and Time t2 (scan period T2D1), Time t3 and Time t4 (scan period T2D3), Time t4 and Time t5 (scan period T2D4), Time t5 and Time t6 (scan period T2D5), and Time t6 and Time t7 (scan period T2D6). The scan patterns P1 to P3 are driven at the scan rate of 300 Hz in the scan periods T2D1 and T2D3 to T2D5, while the scan patterns P4 to P12 are driven at the scan rate of 60 Hz in the scan period T2D2.

In FIGS. 16A and 16B, the touch control circuit 24 performs five 2D scans on the first areas A11 and A12 and only one 2D scan on the second areas A21 and A22 between Time t1 and Time t7. Thus, the first areas A11 and A12 are respectively scanned five times more frequently than the second areas A21 and A22, enabling more responsive touch detection in the first areas A11 and A12 while maintaining adequate touch detection in the second areas A21 and A22.

In other embodiments, the touch control circuit 24 may scan the first areas A11 and A12 at intervals multiple times intermittently while only scanning the second areas A21 and A22 once within a scan period, as illustrated in FIG. 16C. In FIG. 16C, the touch control circuit 24 scans the first areas A11 and A12 three times while scanning the second areas A21 and A22 only once between Time t1 and Time t7, enhancing sensitivity level in the first areas A11 and A12 while ensuring sufficient touch detection coverage in the second areas A21 and A22.

FIG. 16C is similar to FIG. 16A, except that the 2D patterns P1 to P3 are not applied between Time t2 and Time t3, and Time t4 and Time t5, reducing the sensitivity level while conserving power of the first areas A11 and A12 compared to FIG. 16A. The intervals between Time t1 and Time t2, Time t3 and Time t4, Time t5 and Time t6, and Time t6 and Time t7 are referred to as the scan periods T2D1, T2D2, T2D3 and T2D4, respectively. The scan patterns P1 to P3 are driven at the scan rate of 180 Hz in the scan periods T2D 1 to T2D 3. The scan patterns P4 to P12 are driven at the scan rate of 60 Hz in the scan period T2D4.

In FIG. 16C, the touch control circuit 24 performs three 2D scans on the first areas A11 and A12 and only one 2D scan on the second areas A21 and A22 between Time t1 and Time t7. Thus, the first areas A11 and A12 are scanned three times more frequently than the second areas A21 and A22, enabling more responsive touch detection in the first areas A11 and A12 while maintaining adequate touch detection in the second areas A21 and A22.

Figure 17A:
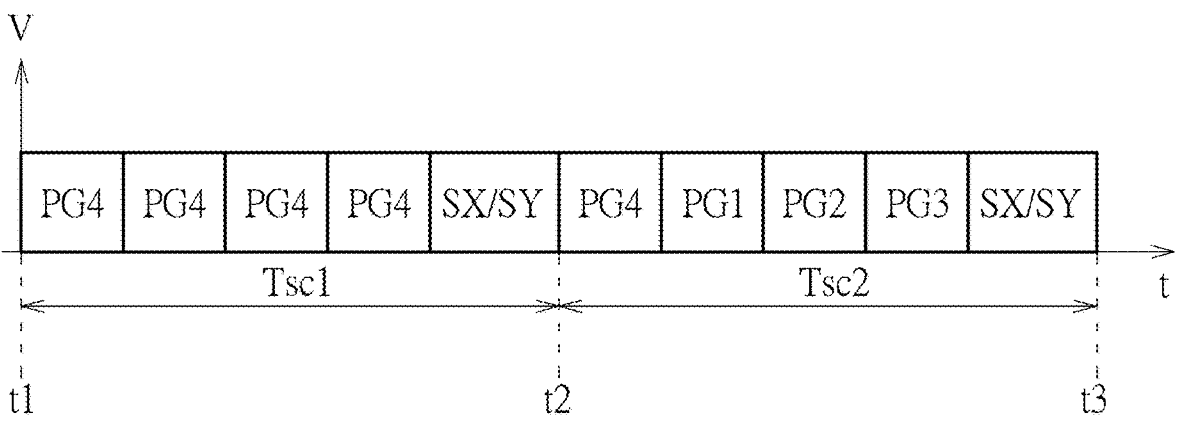
FIGS. 17A to 17C are timing diagrams of the touch panel in FIG. 8 adopting the method in FIG. 15, according to various embodiments of the invention.
Figure 17B:
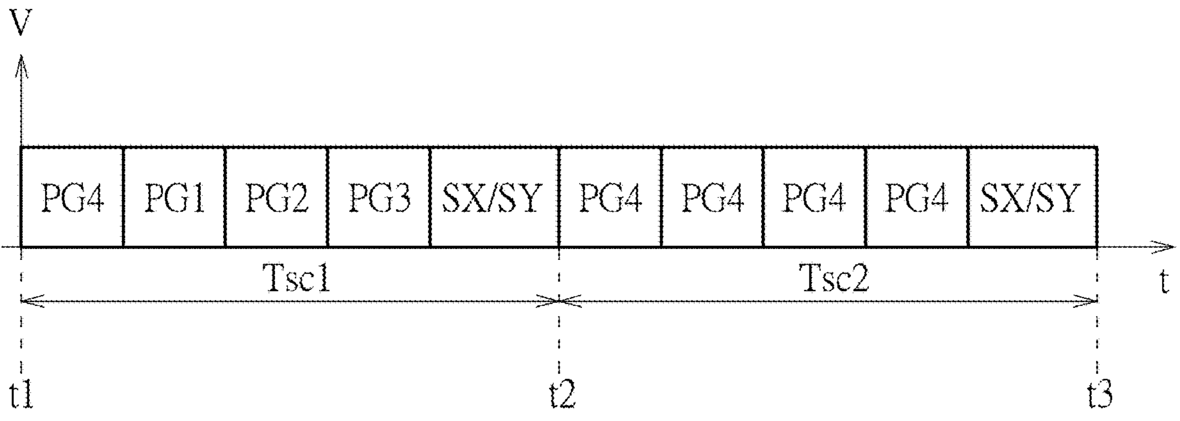
Figure 17C:
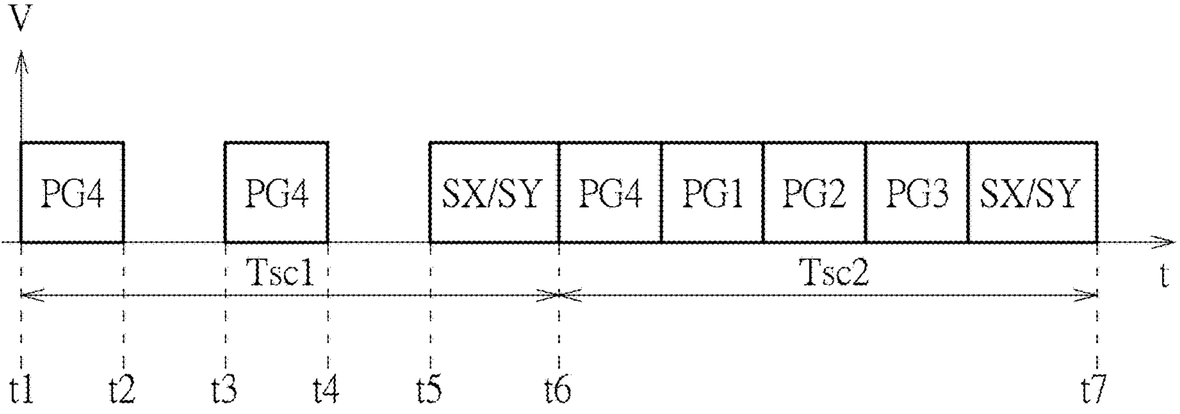

The method 1400 may be further exemplified with reference to FIGS. 9 and 17A to 17C. FIGS. 17A to 17C are timing diagrams of the touch panel 1 in FIG. 9 adopting the method 1400, according to various embodiments of the invention.

The touch device 2 may allocate the first area A1 and the second area A2 of the touch panel 1 to the touch control circuit 24 (S1402 and S1406), with the first area A1 including the group G4, and the second area A2 including the groups G1 to G3. In FIG. 17A, between Time t1 and Time t2 (scan period Tsc1), the touch control circuit 24 may repeatedly apply a 2D scan pattern PG4 to the group G4 in the first area A1 four times in succession (S1404), followed by applying 1D scan patterns SX and SY across the entire touch panel 1. The 1D scan pattern SX is used to perform a horizontal 1D scan, while the 1D scan pattern SY is used to perform a vertical 1D scan.

Between Time t2 and Time t3 (scan period Tsc2), the touch control circuit 24 may apply 2D scan patterns PG4, PG1, PG2, and PG3 to the groups G4, G1, G2, and G3, respectively (S1408), followed by applying 1D scan patterns SX and SY across the entire touch panel 1.

FIG. 17B is similar to FIG. 17A, except that the 2D patterns 2D scan patterns PG4, PG1, PG2, and PG3 are respectively applied to the groups G4, G1, G2, and G3 between Time t1 and Time t2 (scan period Tsc1), while the 2D patterns 2D scan pattern PG4 is applied to the group G4 four times in succession between Time t2 and Time t3 (scan period Tsc2).

The interval between Time t1 and Time t3 may be referred to as the overall scan period Tsc. In FIGS. 17A and 17B, the touch control circuit 24 performs five 2D scans on the first area A1 and only one 2D scan on the second area A2 during the overall scan period Tsc. Thus, the first area A1 is scanned five times more frequently than the second area A2, enabling more responsive touch detection in the first area A1 while maintaining adequate touch detection in the second area A2.

FIG. 17C is similar to FIG. 17A, except that the 2D pattern PG4 is not applied between Time t2 and Time t3, and Time t4 and Time t5, reducing the sensitivity level while conserving power of the first area A1 compared to FIG. 17A. The interval between Time t1 and Time t7 may be referred to as the overall scan period Tsc. In FIG. 17C, the touch control circuit 24 performs three 2D scans on the first area A1 and only one 2D scan on the second area A2 within the overall scan period Tsc. Thus, the first area A1 is scanned three times more frequently than the second area A2, enabling more responsive touch detection in the first area A1 while maintaining adequate touch detection in the second area A2.

Figure 18:
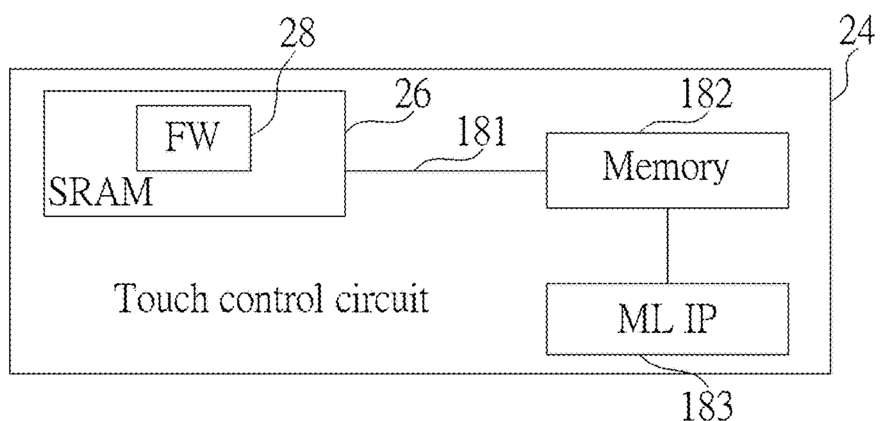
FIG. 18 is a block diagram of the touch control circuit in FIG. 2, according to an embodiment of the invention.

FIG. 18 is a block diagram of the touch control circuit 24 according to an embodiment of the invention. The touch control circuit 24 may include an SRAM 26, a memory 182 and a machine learning intellectual property (ML IP) module 183. The memory 182 may be coupled to the SRAM 26 via bus lines 181, and coupled to the ML IP module 183. The SRAM 26 may have a firmware 28 stored therein to control scan operations. The memory 182 may be a flash memory, and the bus line 181 may be SPI bus lines.

During normal operations of any specific application, the touch control circuit 24 may monitor and capture all touch inputs where a user makes contact with the surface of the touch panel 1. Each touch input is precisely recorded with its corresponding coordinates on the touch panel 1.

The locations of the touch inputs are systematically stored in the memory 182, generating a comprehensive record of user interactions. In some embodiments, the locations of the touch inputs for the appreciation may be organized in a tabular format, though this is not the only possible data structure. Each application running on the touch device 2 may maintain a separate record of touch inputs, allowing for application-specific touch pattern analysis.

The stored touch locations serve a deeper purpose beyond simple input recording. In some implementations, the touch control circuit 24 may retrieve the accumulated touch locations from memory 182 and define the first area directly according to the touch locations of the application on the touch panel 1. For example, the touch control circuit 24 may analyze the touch locations and set an outline that encloses all the touch points of the application, thereby defining the first area. In other embodiments, the touch control circuit 24 may retrieve the accumulated touch locations from memory 182 and feed the touch locations into the ML IP module 183. The ML IP module 183 may use the accumulated touch locations as training input for a machine learning model to analyze the touch patterns and output the optimal location and the appropriate size of the first area. The first area is defined to enhance the touch sensitivity and responsiveness for the specific application, improving the overall user experience. In some embodiments, the ML IP module 183 may record the location and size of the first area in the memory 182. The next time the application is launched on the touch device 2, the touch control circuit 24 may retrieve the first area from the memory 182 and allocate the first area based on the application.

Figure 19:
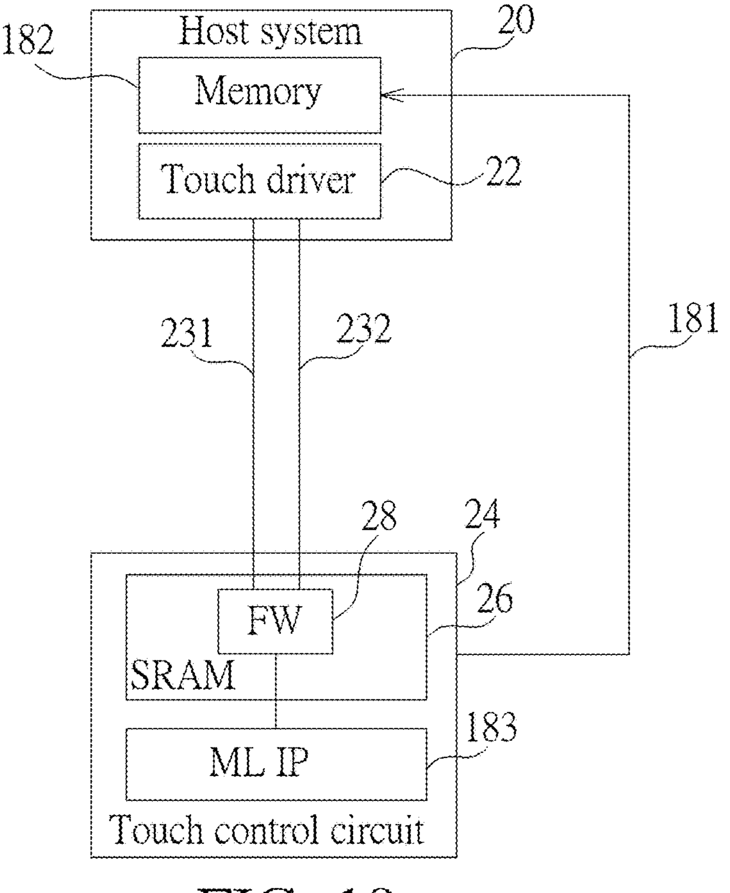
FIG. 19 is a block diagram of the touch device in FIG. 2, according to another embodiment of the invention.

FIG. 19 is a block diagram of the touch device 2 according to another embodiment of the invention. FIG. 19 differs from FIG. 18 in that the memory 182 is located in the host system 20 rather than in the touch control circuit 24. Additionally, the SRAM 26 is coupled to the ML IP module 183. During normal operation of any specific application, the touch control circuit 24 records the location of each input touch on the touch panel 1 in the memory 182 via the bus lines 181. Later, the firmware 28 may request the historical touch locations from the host system 20 and pass the historical touch locations to the ML IP module 183 to train a machine learning model. The training process of the machine learning model is similar to that in FIG. 18, and will not be explained here for brevity. The machine learning model may output the optimal location and size of the first area to the firmware 28, which then applies the multi-area scanning scheme accordingly.

Figure 20:
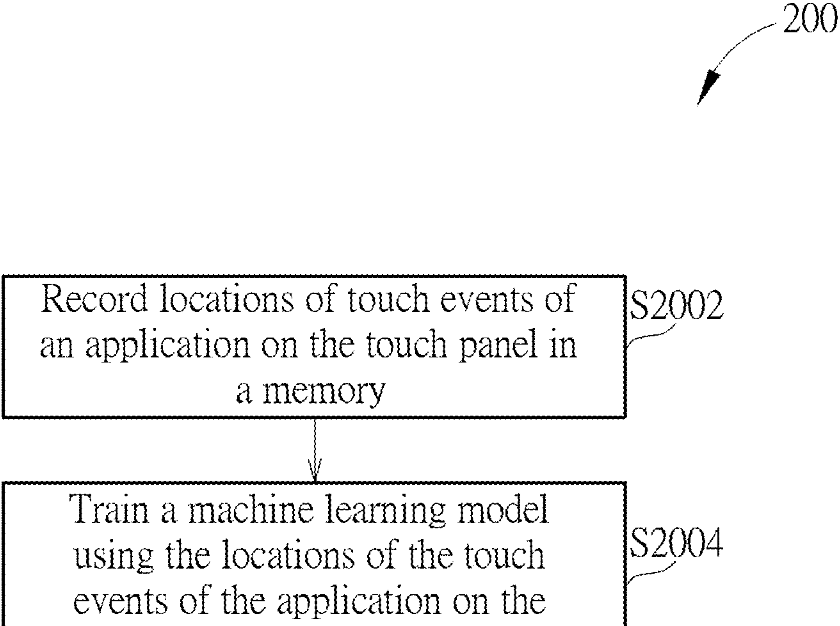
FIG. 20 is a flowchart of a method of training a machine learning model according to the touch data obtained from the touch panel in FIG. 2, according to an embodiment of the invention.

FIG. 20 is a flowchart of a method 2000 of training a machine learning model according to the touch locations obtained from the touch panel 1 according to an embodiment of the invention. The method 2000 includes Steps S2002 and S2004 to define the first area using a machine learning model. Any reasonable step change or adjustment is within the scope of the present disclosure. Steps S2002 and S2004 are detailed as follows:

Step S2002: Record locations of touch events of an application on the touch panel in a memory;

Step S2004: Train a machine learning model using the locations of the touch events of the application on the touch panel to define the first area.

The details of Steps S2002 and S2004 have been previously discussed; therefore, the explanations therefor will not be repeated here for brevity.

Figure 21:
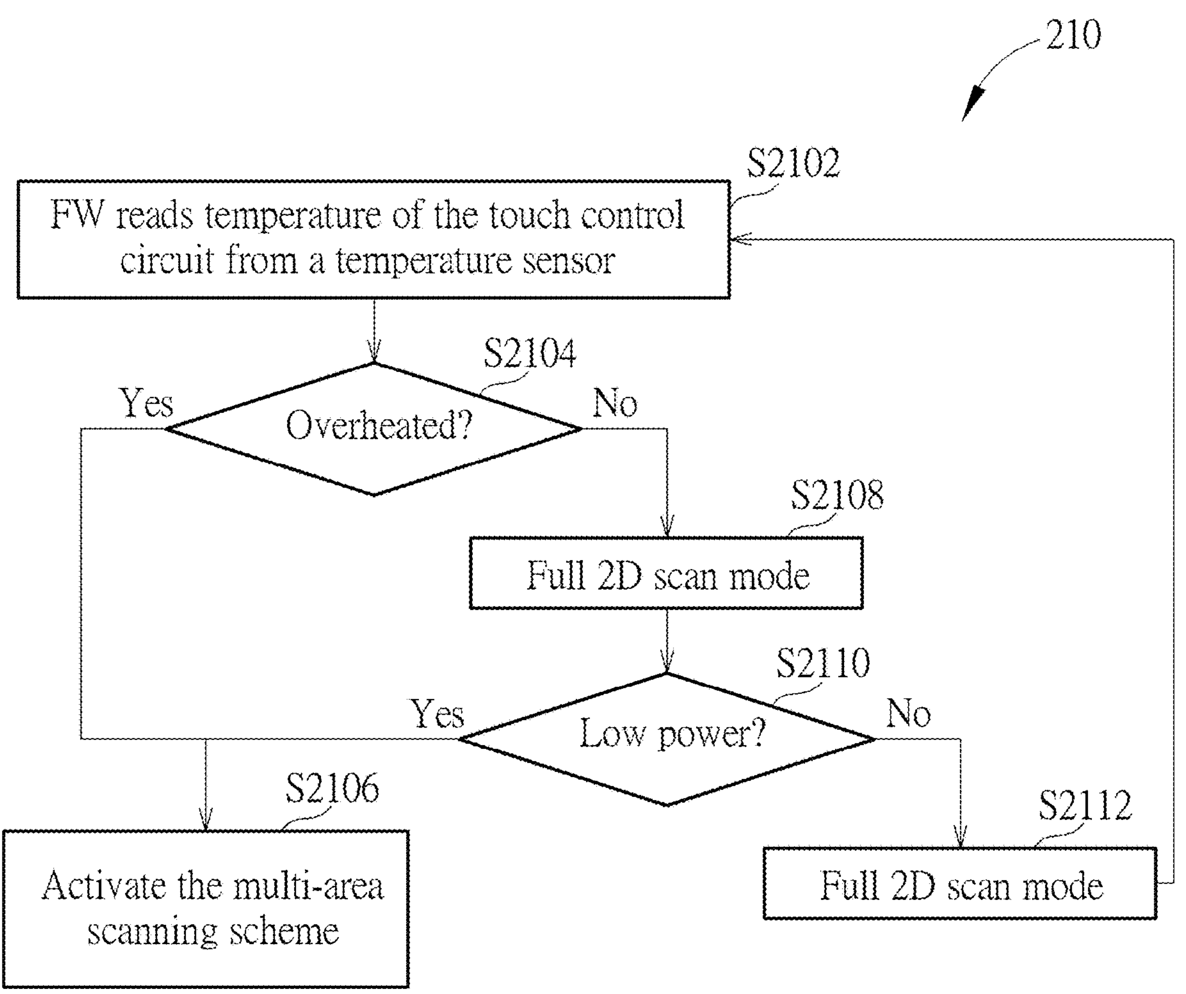
FIG. 21 is a flowchart of a method of activating the multi-area scanning scheme according to an embodiment of the invention.

FIG. 21 is a flowchart of a method 210 of activating the multi-area scanning scheme according to an embodiment of the invention. The method 210 includes Steps S2102 and S2112 to determine a scan mode for the touch device. Any reasonable step change or adjustment is within the scope of the present disclosure. S2102 and S2112 are detailed as follows:

Step S2102: The firmware reads temperature of the touch device from a temperature sensor;

Step S2104: Determine whether the touch device is overheated according to the temperature of the touch device? If so, proceed to Step S2106; if not proceed to Step S2108;

Step S2106: Activate the multi-area scanning scheme;

Step S2108: Enter the full 2D scan mode;

Step S2110: Determine whether the touch device is low on power? If so, proceed to Step S2106; if not proceed to Step S2112;

Step S2112: Enter the full 2D scan mode; go to Step S2102.

The touch device 2 may include one or more temperature sensors to monitor temperatures of the critical components in the touch device 2. The critical components may include but is not limited to the touch panel 1 and the touch control circuit 24.

The firmware 28 reads the temperatures of the critical components in the touch device 2 (S2102), and identifies any overheated condition according to the temperatures readings (S2104). In some embodiments, the firmware 28 may compare a measured temperature against a temperature threshold. If the temperature exceeds the temperature threshold, an overheated condition is identified. Otherwise, a normal condition is recognized.

In Step S2106, if an overheated condition is detected, the firmware 28 selectively activates the multi-area scanning scheme. The multi-area scanning scheme may be implemented using one of the methods 300, 700, 1100, or 1400. Essentially, the touch control circuit 24 may selectively allocates the first area of the touch panel 1 to the touch control circuit 24 according to the temperature readings.

In Step S2108, if a normal condition is detected, the firmware 28 operates the touch panel 1 using a full 2D scan mode, in which a full 2D scan is applied to the entire touch panel 1, providing comprehensive touch detection capabilities.

Beyond temperature monitoring, the firmware 28 may further actively tracks the touch device 2's battery power level. The firmware 28 accesses the battery power of the touch device 2 to identify a low power condition (S2110). In some embodiments, the firmware 28 may compare a remaining battery power against a power threshold. If the remaining battery power drops below the power threshold, a low power condition is identified. Otherwise, a normal condition is recognized.

If a low power condition is detected, the firmware 28 selectively activates the multi-area scanning scheme. The multi-area scanning scheme may be implemented using one of the methods 300, 700, 1100, or 1400. In the embodiment, the host system 20 may actively access the remaining power of the mobile device and determine the low power condition based on the remaining power. If the remaining power is less than a power threshold, the host system 20 may detect the low power condition, and notify the touch control circuit 24 of the low power condition via the bus line 232. In response, the touch control circuit 24 may selectively allocate the first area of the touch panel 1 to the touch control circuit 24 upon the low-power condition. The power-based adaptive approach allows the touch control circuit 24 to selectively allocate and manage touch panel areas based on the available battery power, conserving energy while maintaining essential touch functionality. This method 210 ensures the touch device 2 can continue operating efficiently even under power-constrained conditions while preserving core touch input capabilities.

The touch device and methods of the invention employs different scan methods or scan rates to different areas on the touch panel, enhancing the sensitivity level of an area that requires frequent touch interaction while reducing sensitivity level of another area that requires less or no interaction, effectively conserving energy while ensuring smooth user experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for use by a touch device to operate a touch panel, the method comprising:

a temperature sensor detecting a temperature of the touch device;

identifying an overheat condition based on the temperature of the touch device;

in response to the overheat condition, allocating a first area of the touch panel to a touch control circuit;

performing a 2-dimensional (2D) scan on the first area;

in response to the overheat condition, allocating a second area of the touch panel to the touch control circuit, the second area being non-overlapping with the first area; and excluding the second area of the touch panel from scanning.

2. The method of claim 1, further comprising:

performing a horizontal 1D scan and a vertical 1D scan across the entire touch panel.

3. The method of claim 1, further comprising:

recording locations of touch inputs of an application on the touch panel in a memory.

4. The method of claim 3, further comprising:

training a machine learning model using the locations of the touch inputs of the application on the touch panel to define the first area.

5. The method of claim 3, wherein in response to the overheat condition, allocating the first area of the touch panel to the touch control circuit comprises:

defining the first area according to the locations of the touch inputs of the application on the touch panel.

6. The method of claim 1, wherein in response to the overheat condition, allocating the first area of the touch panel to the touch control circuit comprises:

in response to the overheat condition and a low-power condition, selectively allocating the first area of the touch panel to the touch control circuit according to a remaining power of the touch device.

7. A touch device comprising:

a temperature sensor to detect a temperature of the touch device;

a touch panel; and a touch control device coupled to the touch panel, and configured to identify an overheat condition based on the temperature of the touch device, and, in response to the overheat condition, to allocate a first area of the touch panel and perform a 2-dimensional (2D) scan on the first area, and to allocate a second area of the touch panel and exclude the second area of the touch panel from scanning, wherein the second area is non-overlapping with the first area.

8. The touch device of claim 7, wherein the touch control device further performs a horizontal 1D scan and a vertical 1D scan across the entire touch panel.

9. The touch device of claim 7, wherein the touch control device further records locations of touch inputs of an application on the touch panel in a memory.

10. The touch device of claim 9, wherein the touch control device further trains a machine learning model using the locations of the touch inputs of the application on the touch panel to define the first area.

11. The touch device of claim 9, wherein in response to the overheat condition, the touch control device further defines the first area according to the locations of the touch inputs of the application on the touch panel.

12. The touch device of claim 7, wherein in response to the overheat condition and a low-power condition, the touch control device selectively allocates the first area of the touch panel to the touch control circuit according to a remaining power of the touch device.

13. A touch device comprising:

a temperature sensor to detect a temperature of the touch device;

a touch panel; and a touch control device coupled to the touch panel, and configured to identify an overheat condition based on the temperature of the touch device, and, in response to the overheat condition, to allocate a first area of the touch panel and perform a 2-dimensional (2D) scan on the first area, and to allocate a second area of the touch panel and perform a 1-dimensional (1D) scan on the second area; wherein the second area is non-overlapping with the first area.

14. The touch device of claim 13, wherein the touch control device further adaptively switches to a 2D scan on the second area according to data obtained from the 1D scan of the second area.

15. A touch device comprising:

a temperature sensor to detect a temperature of the touch device;

a touch panel; and a touch control device coupled to the touch panel, and configured to identify an overheat condition based on the temperature of the touch device, and, in response to the overheat condition, to allocate a first area of the touch panel and perform a 2-dimensional (2D) scan on the first area, to allocate a second area of the touch panel and perform a 2D scan on the second area of the touch panel at a lower scan rate than a scan rate of the first area; wherein the second area is non-overlapping with the first area.

16. The touch device of claim 15, wherein the touch control device scans the first area multiple times in succession while only scanning the second area once within a scan period.

17. The touch device of claim 15, wherein the touch control device scans the first area at intervals multiple times intermittently while only scanning the second area once within a scan period.

18. The touch device of claim 15, wherein the touch control device further performs a horizontal 1D scan and a vertical 1D scan across the entire touch panel.

* * * * *